United States Patent [19]

Skala

[11] 4,410,030
[45] Oct. 18, 1983

[54] PRESSURE COOKER WITH REGULATED VAPOR PRESSURE

[76] Inventor: Stephen F. Skala, 3839 S. Wenonah Ave., Berwyn, Ill. 60402

[21] Appl. No.: 204,079

[22] Filed: Nov. 4, 1980

Related U.S. Application Data

[63] Continuation-in-part of Ser. No. 299,214, Oct. 4, 1972, Pat. No. 3,888,303, which is a continuation-in-part of Ser. No. 569,354, Apr. 18, 1975, abandoned, which is a continuation-in-part of Ser. No. 769,389, Feb. 16, 1977, abandoned, and a continuation-in-part of Ser. No. 941,123, Sep. 11, 1978, Pat. No. 4,246,955.

[51] Int. Cl.$^3$ ............................................. F25B 13/00
[52] U.S. Cl. ........................................ 165/2; 126/374; 426/510; 165/18; 99/470
[58] Field of Search ......................... 165/62, 1, 2, 18; 34/77; 426/510, 232, 233, 407, 510, 523; 99/470, 473, 474, 352; 126/374, 373

[56] References Cited

U.S. PATENT DOCUMENTS

| | | | |
|---|---|---|---|
| 942,150 | 12/1909 | Tiemann | 34/77 |
| 4,187,325 | 2/1980 | Tyree, Jr. | 426/510 |

FOREIGN PATENT DOCUMENTS

| | | | |
|---|---|---|---|
| 1138321 | 1/1957 | France | 34/77 |

*Primary Examiner*—Albert J. Makay
*Assistant Examiner*—Henry Bennett
*Attorney, Agent, or Firm*—Stephen F. Skala

[57] ABSTRACT

A pressure cooker regulates pressure over its range of cooking temperatures by regulating condensation and vaporization of contained water. Liquid water which has condensed upon a cooled surface collects in a thermally insulated condensate vessel and is vaporized therefrom by a heated surface to control the partial pressure of water vapor. The pressure cooker may also contain air at a predetermined pressure so that temperature can be controlled over a wide range of hot and cold temperatures as water vapor pressure is regulated to enable an increased range of food processing environments.

In a preferred embodiment, the pressure cooker is part of a system of domestic appliances wherein a fluid circuit containing a liquid phase thermal exchange fluid includes thermal reservoirs to provide thermal inputs for the appliances. The pressure cooker has a primary heat exchanger which connects to the fluid circuit to attain desired food processing temperatures and has a secondary heat exchanger in the condensate vessel which connects to the fluid circuit to regulate partial pressure of water vapor by vaporization and condensation.

11 Claims, 3 Drawing Figures

PRESSURE COOKER WITH REGULATED VAPOR PRESSURE

This application is a continuation-in-part of Ser. No. 299,214 filed Oct. 4, 1972 and now U.S. Pat. No. 3,888,303; and Ser. No. 569,354 filed Apr. 18, 1975 and now abandoned; and Ser. No. 769,389 filed Feb. 16, 1977 and now abandoned; and is now a continuation-in-part of Ser. No. 941,123 filed Sep. 11, 1978 now U.S. Pat. No. 4,246,955.

CROSS-REFERENCES TO RELATED APPLICATIONS

Ser. No. 140,618 now U.S. Pat. No. 4,340,111 entitled Evaporative Cooling of Containers in a Pressure Vessel.

BACKGROUND

This invention relates to pressure cookers and particularly to regulation of pressure therein.

A conventional domestic pressure cooker processes food in an aqueous environment at the temperature and pressure of saturated steam. While such processing is desirable for many food types such as stews and boiled vegetables, it does not provide the gaseous temperature environment needed for roasting or baking. An improved process of gaseous pressure cooking was disclosed by J. O. Hice in U.S. Pat. No. 3,672,908 wherein pressure is maintained above the pressure of saturated steam by a compressed gas during cooking and rapid cooling phases. Foods such as poultry, roast beef, fish, and vegetables retain flavor and moisture substantially above levels expected for conventional processing. It would be desirable to apply the Hice process to domestic food preparation but the institutional type apparatus disclosed by Hice which includes steam for heating and a refrigeration unit or liquefied gases for rapid cooling would be complex and costly. Alternative apparatus using gas or electric for for heating would still require a coolant source.

It would be desirable to extend the range of pressure cooking in gaseous environments to include a period at high temperature and low water vapor pressure to form a crisp brown skin or crust. A domestic pressue cooking appliance would then extend the range of pressure cooking beyond the gaseous environments now known for institutional food processing, yet it would provide conventional pressure cooking in aqueous environments as disclosed in my U.S. Pat. No. 4,340,111. Such versatility is more appropriate for domestic appliances where a wider variety of food types is prepared than for the more specialized institutional apparatus.

In order to combine the heating and cooling capability required for the gaseous pressure processes with the economy required for domestic appliances, it is an object to incorporate a pressure cooking appliance into a system of domestic appliances wherein each of a plurality of appliances is cooled and heated by a liquid phase thermal exchange fluid which exchanges heat with thermal reservoirs. The thermal reservoirs include a hot reservoir at a temperature of about 300° C., a cold reservoir at a temperature of about −30° C., and an auxiliary heat sink near ambient temperatures to utilize otherwise wasted heat. Additional details for such appliance systems may be found in my U.S. Pat. Nos. 4,164,253 and 4,173,993. Additional details for other appliances for use with such appliance systems may be found in my U.S. Pat. Nos. 4,024,904, 4,156,454, and 4,188,794.

OBJECTS OF THE INVENTION it is an object to provide a pressure cooking appliance for processing food in open containers in a gaseous pressure environment to include the method disclosed in the cited patent of J. O. Hice.

It is another object to provide a means for reducing water vapor pressure in the gaseous atmosphere of a pressure cooking appliance thereby enabling control over pressure for high temperature cooking.

It is yet another object to provide a pressure cooking appliance of the kind described to connect to a source of hot and cold thermal exchange fluid for heating and cooling the pressure cooking appliance and for vaporizing water and condensing water vapor therein.

SUMMARY

These and other objects and advantages which will become apparent are attained by the invention wherein a condensible gas in a processing vessel is condensed into a condensate upon a cooled surface to lower pressure and the condensate is vaporized by a heated surface to increase pressure with the condensate being stored until its vaporization in a thermally insulated condensate vessel. In the preferred embodiment of a pressure cooker, the processing vessel is a pressure vessel in which heated food releases water vapor as the condensible gas. As water vapor pressure becomes excessive, gases are transported by a fan from the pressure vessel to the condensate vessel where water vapor becomes water condensate on the cool surface. The gases with diminished water vapor are transported back to the pressure vessel and the water is retained by the condensate vessel whereby the condensible gas and its condensate are conserved.

In order to regulate total pressure and gas composition independently of temperature for effects on food qualities, a noncondensible gas such as air or carbon dioxide is admitted into the pressure vessel to a predetermined pressure. The partial pressure of the condensible gas is then adjusted by vaporization and condensation to attain total setpoint pressure. As cooking begins with increasing temperature, water vapor may be added to reduce food moisture loss by vaporization of water on a heated surface in the condensate vessel. When cooking approaches completion, water vapor pressure may be reduced to enhance food surface crispness by condensation on the cooled surface in the condensate vessel. Other condensible gases may be present in the pressure cooker to include an edible vapor phase heat transfer oil used to heat food by vapor condensation. Both the oil and water are condensed in the condensate vessel, but the water is retained therein and the oil is returned to the pressure vessel.

The vaporization and condensation of fluids in the condensate vessel and heating or cooling of food in the pressure vessel can be attained by various sources of heat or cold including flame, electrical heating elements, fluids at various temperatures, and refrigerants. For use of the present pressure cooker as part of a domestic appliance system, a liquid phase thermal exchange fluid which exchanges heat between the appliances and thermal reservoirs at hot, cold, and moderate temperatures is preferred for the following advantages: The thermal reservoirs provide large thermal capacity for rapid temperature transitions and economical offpeak charging. The auxiliary heat sinks remove unwanted appliance heat after cooking to reduce kitchen humidity and heat load. Sharing of common fluid circuits and other system components results in a moderate cost of each appliance while providing more complex functions such as programmed heating and cooling attained by operating selector and regulator valves. A liquid phase thermal exchange fluid provides precise temperature control over a wide temperature range and use of a single thermal exchange fluid which is selectively heated and cooled allows economical use of a single heat exchanger as a source of heat and cold in an appliance.

The heated and cooled thermal exchange fluid under a differential pressure to which an appliance heat exchanger connects through selector and regulator valves provides an effective and economical means for heating and cooling the pressure vessel and the condensate vessel. With these thermal sources, a source of compressed gas, and sensors for pressure and temperature in the pressure vessel, the present pressure cooker provides improved apparatus for the heating and cooling of food under pressures above saturated steam according to the cited method of Hice and further extends food processing environments to include low partial pressure of water vapor for food surface crisping. The present pressure cooker also includes forced convection of gases onto the food for rapid heating and cooling and, prior to cooking, refrigerated food storage.

DESCRIPTION OF THE DRAWINGS

In FIG. 1, a pressure cooker having a primary heat exchanger for heating and cooling food in a pressure vessel and a secondary heat exchanger for regulating water vapor pressure by vaporization and condensation receives heated and cooled thermal exchange fluid by operating selector and regulator valves. Other appliances, not shown, may be similarly connected to the heated and cooled thermal exchange fluid so that thermal reservoirs and means for delivering the thermal exchange fluid are commonly shared by the appliances.

Figure 1:
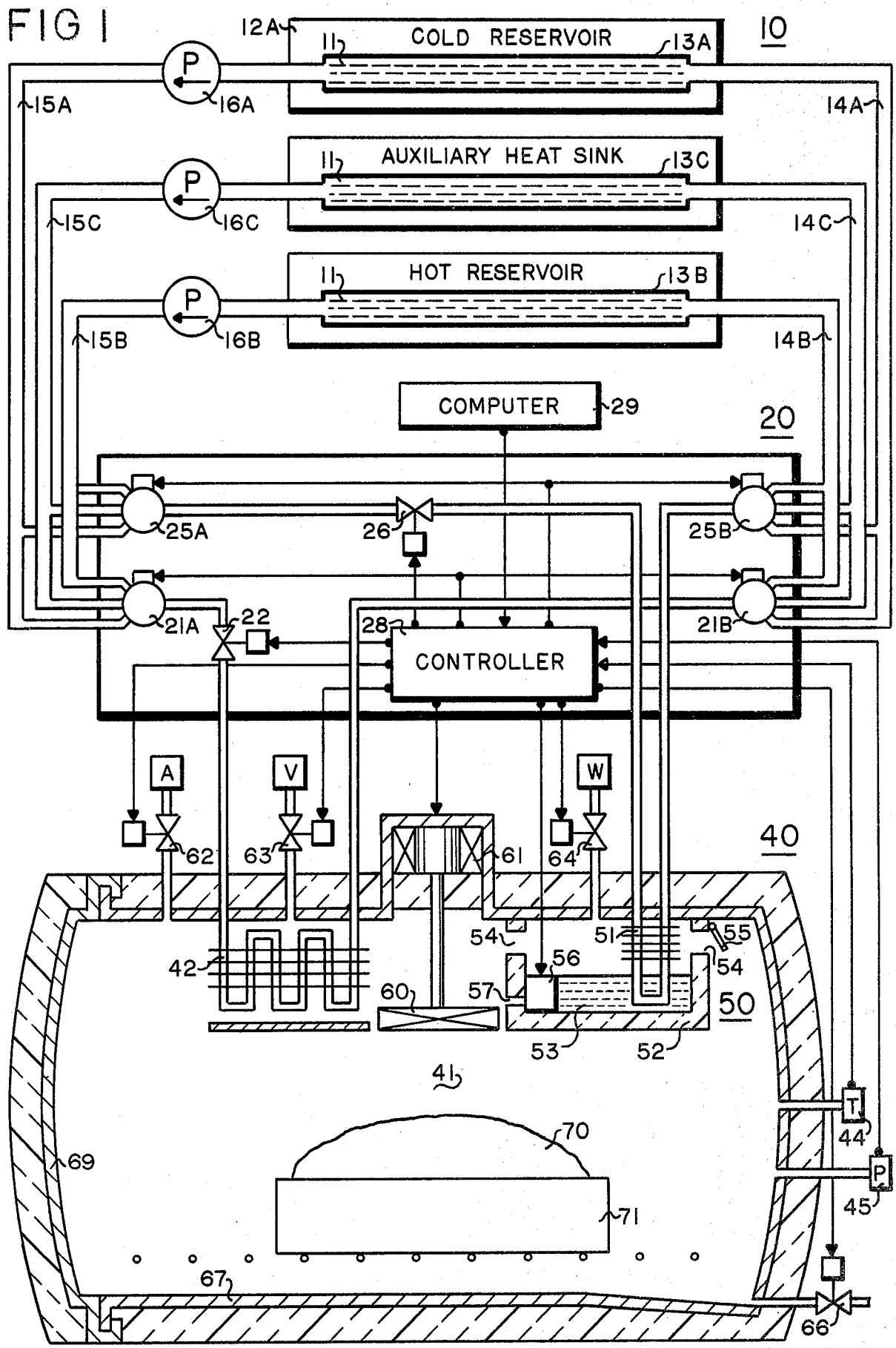
FIG. 1 is a schematic drawing partly in side cross section of the preferred embodiment showing a pressure cooker having a condensate vessel with means for vaporizing water therein and for condensing water vapor to regulate partial pressure of water vapor in a processing vessel according to the invention.

A thermal reservoir and thermal exchange fluid delivery assembly 10 provides thermal exchange fluid 11 under a differential pressure at hot, cold, and moderate temperatures. A cold reservoir 12A includes a reservoir heat exchanger 13A which connects to cold return main 14A and to cold supply main 15A through pump 16A. Similarly, a hot reservoir 12B includes a reservoir heat exchanger 13B which connects to hot return main 14B and to hot supply main 15B through pump 16B. Also similarly, auxiliary heat sink 12C includes a reservoir heat exchanger 13C which connects to moderate temperature return main 14C and to moderate temperature supply main 15C through pump 16C. Thermal energy is stored as latent heat of fusion in the cold reservoir at about $-30°$ C. and in the hot reservoir at about 300° C. The pumps are operated by electric motors to develop a differential pressure when flow of thermal exchange fluid is required.

A thermal exchange fluid flow selector and regulator assembly 20 completes a fluid circuit through the pressure cooker to provide a closed path for circulation of the thermal exchange fluid through a selected thermal reservoir and the pressure cooker. Selector valves 21A and 21B operate together to select among the the supply and return main pairs 15A and 14A, 15B and 14B, and 15C and 14C. A regulator valve 22 modulates flow of the thermal exchange fluid. Similarly, selector valves 25A and 25B operate together to select among the supply and return main pairs 15A and 14A, 15B and 14B, and 15C and 14C. A regulator valve 26 modulates flow of the thermal exchange fluid. The selector and regulator valves operate in response to power from controller 28 which operates in response to information from sensors in the pressure cooker and to setpoints generated by computer 29 according to known servosystem principles. The computer includes memory and programs for modifying stored recipies to provide a sequence of temperature, pressure, and gas flow setpoints according to such inputs as food type and size and desired final qualities such as gradients and degree of cooking, moisture content, and surface browning and crispness.

A pressure cooking appliance assembly 40 connects to the thermal exchange fluid flow selector and regulator assembly 20 to receive regulated flow of the thermal exchange fluid, to receive power inputs from the controller, and to transmit pressure and temperature information to the controller. A pressure chamber 41 is heated and cooled by thermal exchange fluid flowing through primary heat exchanger 42. Temperature sensor 44 and pressure sensor 45 transmit information to the controller. A vapor pressure control assembly 50 includes a secondary heat exchanger 51 which is heated and cooled by thermal exchange fluid, a thermally insulated condensate vessel 52 which contains water or other condensate 53 and communicates with the pressure chamber 41 through ports 54, and a barometrically operated damper 55 over one of the ports. A condensate flow controller 56 and conduit 57 are normally closed but can be opened to allow the condensate to flow from the condensate vessel.

A fan 60 is driven by a reversible variable speed motor 61. Compressed air or other noncondensible gas is admitted by air valve 62. Gases are vented by vent valve 63. Water or other vapor phase thermal fluid is admitted by water valve 64. Drain valve 66 provides drainage for flow from the condensate vessel and for cleaning of pressure vessel 67.

In a representative cooking operation, securable lid 69 is opened, food 70 such as roast beef in an open container 71 such as a roasting pan is placed in the pressure chamber, and the lid is secured. Data relating to food type, final qualities, and serving time is entered into the computer. The computer generates temperature and pressure setpoints for transmission to the controller. If the food is to be processed for dinner of the following day, the computer transmits a signal for a low temperature to the controller which applies power to position selector valves 21A and 21B to allow flow of cold thermal exchange fluid from supply main 15A to return main 15B and applies power to open regulator valve 22. The regulator valve remains open until temperature sensor 45 corresponds to the computer setpoint temperature and thereafter opens aand closes to maintain the sertpoint. At a computed time before serving, the computer generates a pressure setpoint and the controller provides power to open air valve 62 for admission of compressed air until pressure sensor 46 corresponds to the pressure setpoint. Selector valves 21A and 21B are positioned to admit flow of hot thermal exchange fluid and regulator valve 22 is opened to attain within the pressure chamber the temperature setpoint generated by the computer. The fan motoer 61 receives a computed level of power from the controller for fan 60 to circulate gases through the primary heat exchanger 41 and onto the food. The computer generates another pressure setpoint to enable control of water vaporization from the condensate vessel 52. The controller provides power to momentarily open water valve 64, to position selector valves 25A and 25B to admit flow of thermal exchange fluid from hot supply main 15B to hot return main 14B, and to open regulator valve 26. The heated secondary heat exchanger 51 vaporizes water 53 which vapor enters the pressure chamber through ports 54. When the setpoint pressure is attained, regulator valve 26 is closed. As water vapor is released by the food, pressure increases above the pressure setpoint and selector valves 25A and 25B are positioned to allow flow of thermal exchange fluid at a moderate temperature from supply main 15C to return main 14C. The regulator valve 26 is opened and fan 60 reverses to force gases through the condensate vessel 52 and to open damper 55. Water vapor condenses on the cool surface of the secondary heat exchanger 51 and the condensate drops into the bottom of the condensate vessel 52. When the pressure at sensor 46 corresponds to the pressure setpoint, the regulator valve 26 closes and the fan is reversed to close barometric damper 55 and to force flow of gases upon the food. As cooking approaches completion, the computer generates a higher temperature setpoint and a lower pressure setpoint for browning and crisping of the food surface. The primary heat exchanger 41 is heated by hot thermal exchange fluid and the secondary heat exchanger 51 is cooled by cool thermal exchange fluid. The fan is first reversed to force gases through the condensate vessel for condensation of water vapor and is then again reversed to direct hot gases on the food and to so alternate to maintain setpoint pressure and temperature. When cooking is completed, the computer generates a low temperature setpoint and a high pressure setpoint for rapid cooling with reduced loss of food moisture. The primary heat exchanger 41 first receives flow of thermal exchange fluid at a moderate temperature to remove the unwanted appliance heat with minimal energy use for cooling and after a computed pressure chamber temperature is attained the primary heat exchanger receives flow of cold thermal exchange fluid. The fan 60 operates at full speed to direct cold gases upon the food. Air valve 62 is operated to admit compressed air and maintain pressure chamber pressure at setpoint level. When cooling has been completed, the computer generates a low pressure setpoint and the controller applies power to vent valve 63 so that pressure chamber pressure drops to ambient level. Lid 68 is opened and the food is removed.

Alternative practices of the preferred embodiment include:

Flow of gases through the condensate vessel 52 may be controlled by a solenoid operated damper, not shown, to replace barometric damper 55. Fan reversal would not be required and water vapor could be added or removed at the same time that gases are directed upon the food.

As an alternative to rapid cooling by forced convection of cool gases upon the food, condensate flow controller 56 may be opened to allow flow of water 53 through conduit 57 onto a slowly rotating fan 60 for a trajectory onto the food.

Figure 2:
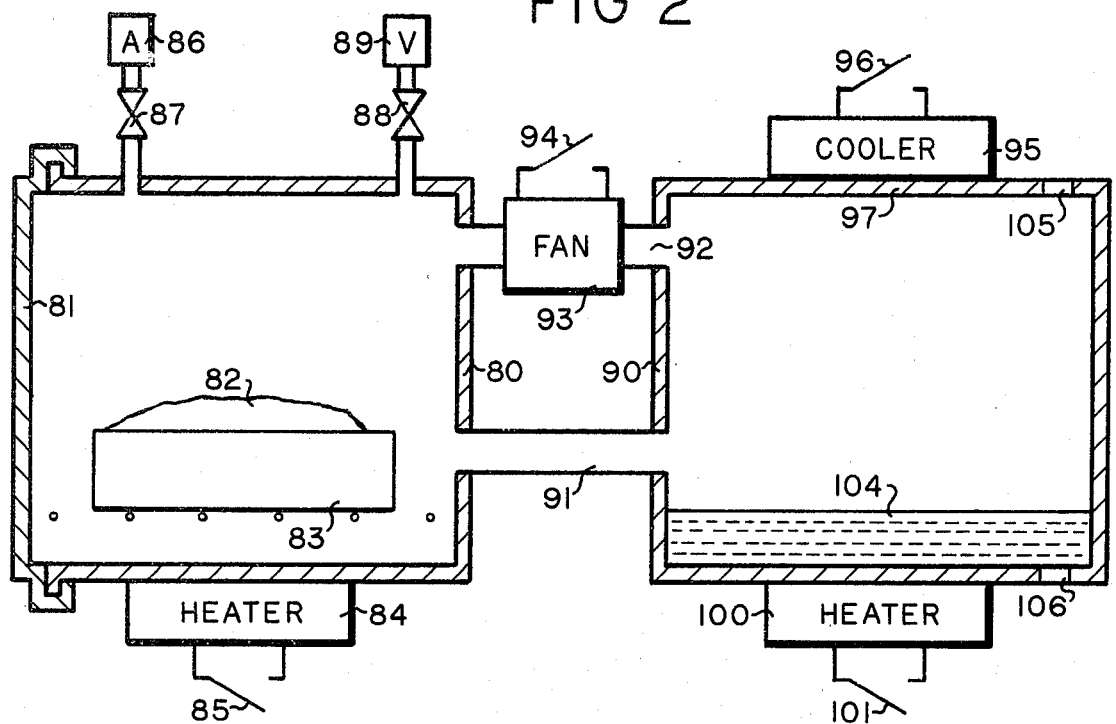
FIG. 2 is a schematic drawing partly in side cross section of an alternative embodiment of a pressure cooker having a separate condensate vessel communicating with a processing vessel to control partial pressure of water vapor therein.

In FIG. 2, a pressure vessel 80 having a securable lid 81 contains food 82 in an open container 83. A heater 84 operated by switch 85 is a controlable heat source such as an electrical heater, flame, or steam from which heat is transferred to the pressure vessel. Compressed air 86 or other noncondensible gas such as nitrogen or carbon dioxide is admitted into the pressure vessel by gas valve 87. Gases can be released from the pressure vessel by vent valve 88 to vent 89.

A condensate vessel 90 which is thermally isolated from the pressure vessel communicates therewith through duct 91 and duct 92 which encloses a fan 93 operated by switch 94. A cooler 95 operated by switch 96 is a controlable source of cold such as a refrigerant or a cool fluid which provides a cool surface 97 within the condensate vessel. A heater 100 operated by switch 101 is a controlable source of heat which provides within the condensate vessel a hot surface adjacent to a body of water 102 or other edible condensate such as a mineral oil. Such condensates form condensible gases at operating temperatures of the pressure vessel. Plug 105 can be removed for addition of water and plug 106 can be removed for drainage of water from the condensate vessel.

In a representative operation regulated in response to temperature and pressure gages, not shown, water is added to the condensate vessel 90, compressed air is admitted into the pressure vessel 80, and switches 85 and 101 are closed to operate heaters 84 and 100. Temperature and pressure in the pressure vessel increase as an operating temperature is approached with the partial pressure of water vapor from vaporization in the condensate vessel adding to increased pressure of the compressed air. When total pressure approaches operating pressure, switch 101 is opened. As pressure exceeds operating levels due to vaporization of moisture from the food, switches 94 and 95 are operated to provide a cool surface within the condensate vessel over which flow gases from the pressure vessel. Water vapor condensate forming on the cool surface drops into the bottom of the condensate vessel and the gases with reduced water vapor flow back into the pressure vessel. When the total pressure is reduced to operating levels, the fan switch 94 and cooler switch 96 are opened. When cooking is completed, switch 85 is opened, the pressure vessel cools to temperatures substantially below the atmospheric boiling point of water, vent valve 88 is opened to to release compressed gases, and the food is removed.

Figure 3:
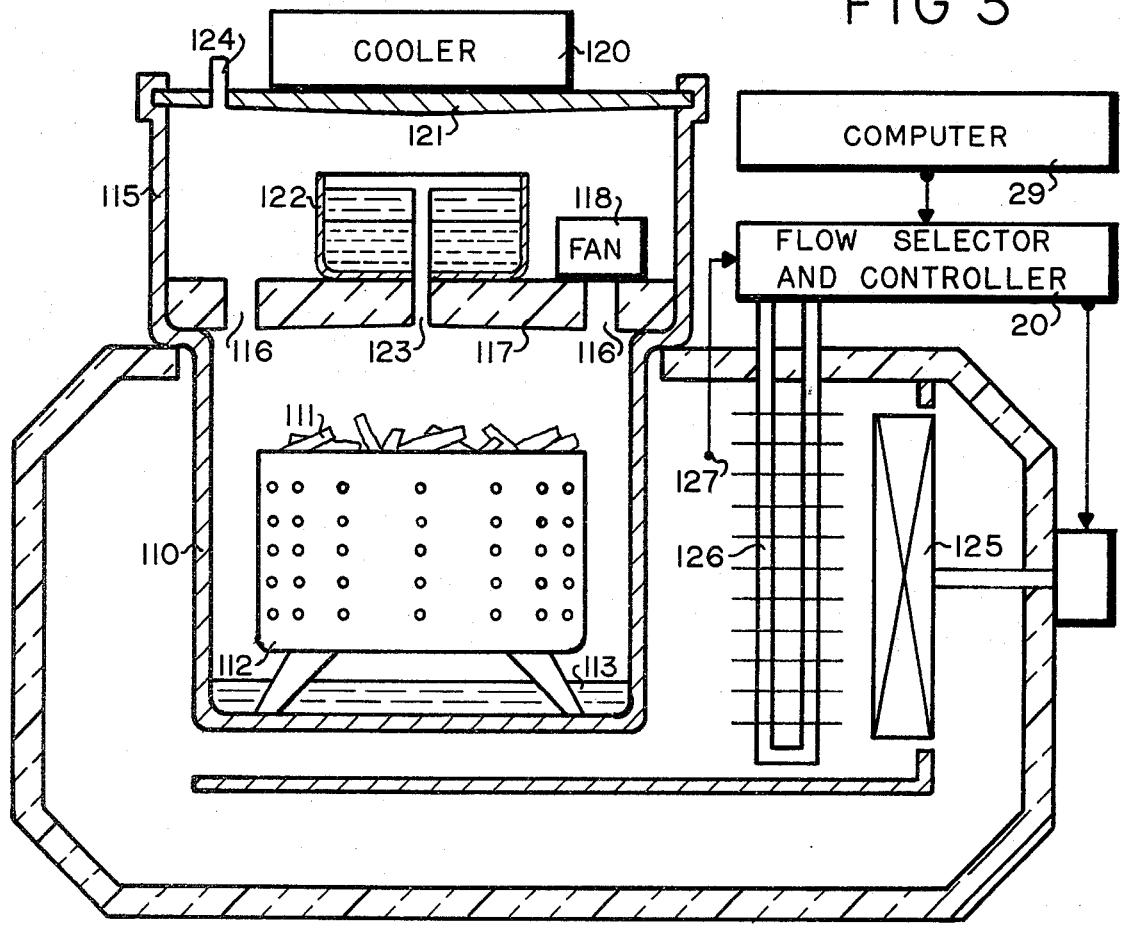
FIG. 3 is a schematic drawing partly in side cross section of an alternative embodiment of a pressure cooker in which food is heated by condensation of a vapor phase heat transfer fluid and having a condensate vessel in which vapors of water and the heat transfer fluid are condensed to reduce the partial pressure of water vapor while the heat transfer fluid is returned to the pressure vessel.

In FIG. 3 showing food heated by condensation thereon of a vapor phase heat transfer fluid, the vapors of both water and the heat transfer fluid are condensed in the condensate vessel to regulate partial pressure of water vapor in the pressure vessel. The processing environment comprises a temperature which is the boiling temperature of the heat transfer fluid at operating pressure, a saturated atmosphere of the heat transfer fluid, compressed air which retards food moisture loss particularly during initial heating and final cooling phases, and a regulated partial pressure of water vapor which is released by the food. The pressure vessel is immersed in circulating air at a temperature regulated to provide predetermined heat transfer characteristics within the pressure vessel for desirable food qualities.

A pressure vessel 110 contains food 111 in a perforated container 112. The food is of a type which can be fried for a crisp browned surface such as sliced potatoes or chicken. A vapor phase heat transfer fluid 113 forms a layer at the bottom of the pressure vessel. The heat transfer fluid is selected from edible liquids having, at operating pressures, boiling temperatures which provide appropriate cooking conditions. Examples are fatty acids such as butyric having an atmospheric boiling point of 164° C. and mineral oils distilled at similar temperatures.

A condensate vessel 115 is secured to the pressure vessel for communication through ports 116 in a thermal separator 117. A motor operated fan 118 operating above a predetermined pressure in response to a barometric switch, not shown, is located at one of the ports. A cooler 120, which may be based on a cooled fluid or on naturally convecting ambient air, provides a cool surface 121 within the condensate vessel. A condensate collector 122 has a standpipe 123 passing through the thermal separator 117. A valve 124 provides a means for admitting and releasing gases to attain desired pressures in the pressure vessel.

Temperature of the pressure vessel 110 is regulated by air circulating in a closed path which includes a fan 125, the pressure vessel, a heat exchanger 126, and a temperature sensor 127. The heat exchanger 126 is connected to thermal exchange fluid flow selector and regulator assembly 20 which regulates flow of thermal exchange fluid through the heat exchanger and thermal reservoirs to maintain at the temperature sensor 127 setpoint temperatures generated by computer 29 as described with reference to FIG. 1 and in my U.S. Pat. No. 4,024,904 entitled "Forced Air Range with Thermal Exchange Fluid".

In a representative operation, food and the heat transfer fluid are placed in the pressure vessel, the condensate vessel 115 is secured, compressed air is admitted through valve 123 to a predetermined pressure, and computer 29 is programmed to generate temperature setpoints. An initial temperature setpoint of 225° C. with rapid air circulation provides effective heating of the pressure vessel 110. Vapors of the boiling heat transfer fluid condense on the food to transfer heat of condensate and drop back to the bottom of the pressure vessel. Water evaporating from the food lowers its temperature with consequent further condensation of the heat transfer fluid and an increase in water vapor pressure. When total pressure is sufficient to actuate fan 118, gases flow through the condensate vessel, vapors of water and the heat transfer fluid condense on the cool surface 121, and the condensate drops into the condensate collector 122. As water and heat transfer fluid separate and accumulate to the level of standpipe 123, the heat transfer fluid flows back into the pressure vessel. Fan 118 stops when total pressure has been sufficiently reduced by condensation of water vapor. Temperature setpoints are reduced as cooking progresses in accordance with the smaller quantity of heat transfer required to maintain food temperatures. When the computer generates a low temperature setpoint to stop the cooking phase, cool thermal exchange fluid flows through heat exchanger 126 to absorb unwanted heat. Pressure within the pressure vessel falls substantially to the initial pressure of compressed air which is released through valve 124 to allow the pressure vessel to be opened for removal of the food.

What I claim is:

1. A process for regulating pressure in a processing vessel over a range of temperatures by regulating the partial pressure of a condensible gas, comprising the steps of:

cooling a surface which communicates with the processing vessel sufficiently to condense a portion of the condensible gas into its condensate and collecting the condensate in a condensate vessel which is thermally insulated from the processing vessel, said cooling continuing until the pressure in the processing vessel is reduced to a predetermined level, said cooled surface and condensate vessel being at substantially the pressure of the processing vessel, and heating a surface which is in the condensate in the condensate vessel sufficiently to vaporize at least a portion of the condensate until the partial pressure of the condensible gas increases the pressure in the processing vessel to a predetermined level whereby the condensible gas and its condensate are conserved under transformation between gaseous and liquid phases to regulate pressure in the processing vessel.

2. A processing vessel with regulated pressure over a range of temperatures, comprising:

the processing vessel having means for attaining predetermined temperatures and containing a condensible gas and its condensate, a condensate vessel communicating with the processing vessel and thermally insulated therefrom, said condensate vessel and processing vessel being at substantially the same pressure, means for sensing pressure within the processing vessel and for comparing the sensed pressure to a setpoint pressure to determine a pressure error, means for cooling a surface communicating with the condensate vessel on which cooled surface the condensible gas condenses to form the condensate and means for collecting the condensate in the condensate vessel, said means for cooling being responsive to the pressure error to reduce pressure for a high pressure error, and means for heating a surface having a heat exchange relationship with the condensate in the condensate vessel to vaporize a portion of the condensate, said means for heating being responsive to the pressure error to increase pressure for a low pressure error whereby the condensible gas and its condensate are conserved under transformations between gaseous and liquid phases to regulate pressure in the processing vessel.

3. The processing vessel of claim 2 wherein the processing vessel includes means for admitting a noncondensible gas to attain a predetermined pressure therein.

4. The processing vessel of claims 2 or 3 further comprising a food substance within the processing vessel which releases water vapor as a condensible gas when heated.

5. The processing vessel of claim 2 wherein the cooled surface communicating with the condensate vessel and the heated surface in a heat exchange relationship with the condensate comprise a secondary heat exchanger in an assembly further comprising:
- a plurality of thermal sources including a hot source and a cold source, and
- a thermal exchange fluid and means for transporting the thermal exchange fluid in a path which includes the secondary heat exchanger and the thermal sources.

6. The processing vessel of claim 5 wherein the means for attaining predetermined temperatures in the processing vessel comprises a primary heat exchanger having a heat exchange relationship with the processing vessel and being included in the path which includes the thermal sources whereby the primary and the secondary heat exchangers exchange heat with the same thermal sources by means of the same thermal exchange fluid.

7. The processing vessel of claim 4 further comprising:
- a vapor phase heat transfer fluid to comprise an additional condensible gas which transfers heat to the food as heat of condensation thereby vaporizing water in the food and flowing to the processing for vaporization, said vapors of the heat transfer fluid and water entering the condensate vessel for condensation therein,
- means in the condensate vessel for separating condensates of the heat transfer fluid and water, and
- means for returning the heat transfer fluid condensate to the processing vessel whereby the partial pressure of the water vapor is reduced and the heat transfer fluid is reused for heating the food substance.

8. The process of claim 1 wherein the cooled surface is within the condensate vessel and comprising the further step of transporting gases between the processing vessel and the condensate vessel whereby the condensate is both collected in and vaporized from the condensate vessel.

9. The process of claim 8 wherein the cooled surface and the heated surface are the same surface and the step of cooling and heating the surface comprises cooling a thermal exchange fluid and transporting the cooled thermal exchange fluid to the surface and heating the thermal exchange fluid and transporting the heated thermal exchange fluid to the surface.

10. The process of claim 1 wherein the condensible gas is water vapor which is released by a food substance within the processing vessel and a vapor phase heat transfer fluid is included in the processing vessel as a second condensible gas for heating the food substance, comprising the further steps of:
- collecting the condensate of the heat transfer fluid on a heated surface for vaporization thereof and condensation on the food substance thereby heating and vaporizing water therefrom which increases pressure in the processing vessel,
- condensing a portion of the water vapor and of the heat transfer fluid on the cooled surface, said condensates collecting in the condensate vessel, and
- separating the heat transfer fluid condensate from the water for return to the heated surface whereby the water vapor partial pressure is reduced and the heat transfer fluid is reused for heating of the food substance.

11. The processing vessel of claim 2 wherein the means for attaining predetermined temperatures in the processing vessel comprises:
- a primary heat exchanger having a heat exchange relationship with the processing vessel,
- a plurality of thermal sources including a hot source and a cool source, and
- a thermal exchange fluid and means for transporting the thermal exchange fluid in a path which includes the primary heat exchanger and the thermal sources.

* * * * *